UNITED STATES PATENT OFFICE 2,425,042

GLYCOL DIETHERS

Raymond W. McNamee, South Charleston, W. Va., and Louis G. MacDowell, Lakeland, Fla., assignors to Carbide and Carbon Chemicals Corporation, a corporation of New York No Drawing. Application December 1, 1943, Serial No. 512,485

7 Claims. (Cl. 260—615)

The subject of this invention is an improved process for preparing glycol or polyglycol diethers. The invention more particularly relates to a method for making diethers of glycols and polyglycols having an odd number of alkylene glycol units, such as ethylene glycol, triethylene glycol, pentaethylene glycol, and the like.

While the monoethers of mono- and polyalkylene glycols can be prepared readily by the action of alkylene oxides on monohydric alcohols, the preparation of the diethers of these glycols is more difficult. Alkylation of the monoethers by means of alkylating agents, such as diethyl sulfate, involves considerable expense. Methods for making the diethers of the higher polyglycols, which depend upon a reaction between the sodium derivative of an alcohol and a halogen substituted ether, also involve considerable expense and difficulty in manipulation.

According to this invention, diethers of glycols and polyglycols are prepared by the hydrogenolysis of glyoxal tetra-acetals, or by the hydrogenolysis of pyruvic aldehyde (methyl glyoxal) di-acetals di-ketals. The nature of the glycol or polyglycol diether formed depends on the acetal involved and on the type of monohydric alcohol employed in forming the tetra-acetals or the di-acetals di-ketals. The general reaction may be represented as follows:

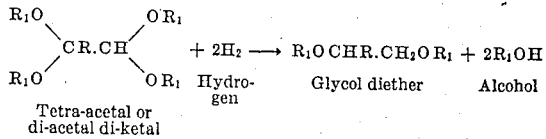

where R is hydrogen or methyl, and $R_1$ is an alkyl, aralkyl, alkoxyalkyl, alkoxyalkenoxyalkyl or alkoxy-polyalkenoxy-alkyl radical.

When R is hydrogen and $R_1$ is alkyl or aralkyl, dialkyl or diaralkyl ethers of ethylene glycol are formed as well as the alcohol corresponding to the alkyl or aralkyl group. The alcohols employed in making the intermediate glyoxal tetra-acetals include methyl, ethyl, isopropyl, butyl, 2-ethylhexyl, lauryl and benzyl alcohols. The glyoxal tetra-acetals may be made by heating glyoxal with a monohydric alcohol and removing the water of reaction, as shown in our copending application Serial No. 478,638, filed March 10, 1943, now Patent No. 2,360,959. Mixed acetals arise from the use of a mixture of alcohols and result in mixed glycol ethers, for instance, the methyl ethyl ether of ethylene glycol.

When R is methyl and $R_1$ is alkyl or aralkyl, as above, the corresponding diethers of 1,2-propylene glycol are formed. The intermediate di-acetals di-ketals of pyruvic aldehyde required may be formed by refluxing pyruvic aldehyde with an excess of the alcohol at temperatures between 100° C. and 135° C. in the presence of an acidic catalyst.

When R is hydrogen or methyl, and $R_1$ is alkoxyalkyl, dialkyl ethers of trialkylene glycols are formed. Thus, when glyoxal tetramethoxyethyl acetal is hydrogenolyzed, triethylene glycol dimethyl ether is formed according to the following scheme:

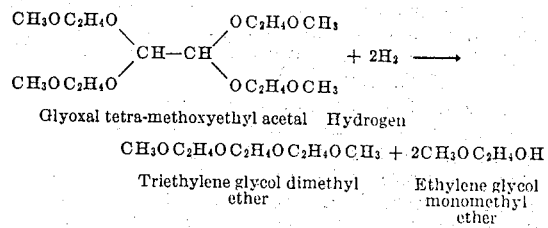

Glyoxal tetra-methoxyethyl acetal    Hydrogen $CH_3OC_2H_4OC_2H_4OC_2H_4OCH_3 + 2CH_3OC_2H_4OH$ Triethylene glycol dimethyl ether    Ethylene glycol monomethyl ether In a similar manner the hydrogenolysis of glyoxal tetra-methoxyethenoxyethyl acetal and glyoxal tetra-methoxydiethenoxyethyl acetal yields pentaethylene glycol dimethyl ether and heptaethylene glycol dimethyl ether, respectively. The preparation of the glyoxal tetra-alkoxy acetals is discussed in our United States Patent No. 2,321,904.

The preparation of diethers of polyglycols having an even number of combined alkylene glycol units, such as diethylene glycol or tetraethylene glycol is also within the scope of the invention. In this instance, mixed tetra-acetals of glyoxal are utilized. For instance, the mixed tetra-acetal of glyoxal with two mols of methanol and two mols of ethylene glycol monomethyl ether, which may exist as various isomers, including (A)

(B)

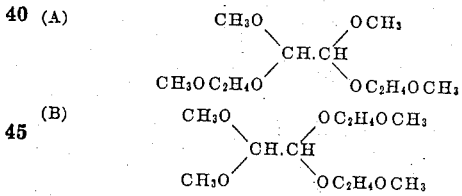

yield various products on hydrogenolysis. Acetal scission of isomer A by treatment with hydrogen results in a mixture of ethylene glycol dimethyl ether, diethylene glycol dimethyl ether, and triethylene glycol dimethyl ether, in which the formation of diethylene glycol dimethyl ether is statistically favored. Acetal scission of isomer B yields the diethylene glycol dimethyl ether.

Thus, by the hydrogenolysis of the glyoxal tetra-acetals formed by reacting glyoxal with an equimolar mixture of methanol and ethylene glycol monomethyl ether, predominantly diethylene glycol dimethyl ether may be formed.

For the preparation of the dimethyl ether of tetraethylene glycol, the mixed glyoxal tetra-acetals with two mols of ethylene glycol monomethyl ether and two mols of diethylene glycol monomethyl ether, are employed, including the isomers.

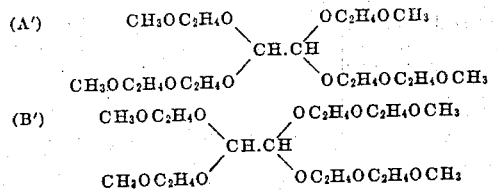

Acetal scission of isomer A' by hydrogenolysis yields a mixture of triethylene glycol dimethyl ether, tetraethylene glycol dimethyl ether, and pentaethylene glycol dimethyl ether, with the second compound predominating, whereas, acetal scission of isomer B' by hydrogenolysis yields tetraethylene glycol dimethyl ether. In a similar manner the diethers of higher even-numbered polyalkylene glycols may be prepared by hydrogenolyzing mixed glyoxal tetra-acetals with equimolar amounts of (1) an alkylene glycol mono-ether or a polyalkylene glycol mono-ether having an odd number of alkenoxy units, and (2) of a polyalkylene glycol mono-ether having an even number of alkenoxy units.

In each of the foregoing instances, one or more monohydroxyl compounds are recovered corresponding to the monohydroxyl compound or alcohol employed in forming the glyoxal tetra-acetal or pyruvic aldehyde di-acetals, di-ketals. Such monohydroxyl compound may be employed in forming additional tetra-acetals or di-acetals, di-ketals for use in the reaction.

The hydrogenolysis is preferably carried out in the liquid phase under super-atmospheric pressure, and in the presence of a metallic hydrogenating catalyst. The preferred catalysts are the commercial Raney nickel catalysts, such as those described in the United States Patent No. 1,563,587 of M. Raney, although other hydrogenating catalysts may be used, such as copper-chromium oxide, platinum and palladium black. The nickel catalysts may be promoted by the addition of various metallic substances, as is known in the art. Amounts of catalyst between 2% and 10% of the tetra-acetal or di-acetal di-ketal are preferred. The more useful range of hydrogen pressures is 200 to 2000 p. s. i. (pounds per square inch gauge), although higher or lower pressures may be employed. The hydrogen pressure may be maintained constant during the reaction by introducing additional hydrogen, or it may be permitted to decline. The end of the hydrogenolysis is indicated, on the one hand, by the inability of the reaction mixture to absorb hydrogen, and, on the other hand, by the pressure of the hydrogen becoming static. The usual precautions attendant to working with high pressures should be observed.

The temperature of the reaction depends to some extent on the nature of the tetra-acetal or di-acetal di-ketal to be hydrogenolyzed. Where the acetals or acetal-ketals of alkanols are involved, higher temperatures up to about 400° C. usually may be employed. Where the mono-hydroxyl compound acetalized is a glycol or polyglycol mono-ether, the temperature should be kept below that at which rupture of the ether linkages in the glycol or polyglycol mono-ethers occurs to a substantial extent. In general, such destructive hydrogenation begins at about 300° C., and becomes increasingly severe up to the maximum operable temperature of 400° C. By increasing the amount of catalyst or the reaction time, or both, lower temperatures, down to about 150° C. may be employed in either instance.

The glycol and polyglycol diethers are for the most part known compounds, and they have various applications in the arts as solvents, plasticizers, extractants, lubricants, ingredients of fluids for transmitting pressure, and as absorbents for refrigerants.

The examples to follow will illustrate the principles of the invention:

EXAMPLE 1

*Ethylene glycol dibutyl ether*

Glyoxal tetra-butyl acetal (400 grams) together with 16 grams of finely-divided Raney nickel catalyst were charged to an autoclave, and a hydrogen pressure of 1000 p. s. i. was maintained at a temperature of 200° to 220° C. for about 4 hours. After release of the pressure, and cooling, the contents of the autoclave were distilled and a 75% yield of the dibutyl ether of ethylene glycol was obtained. This material was identified by its boiling point of 80° C. at 10 mm., Hg, and its specific gravity of 0.836 at 20° C. A corresponding amount of butanol was also recovered.

EXAMPLE 2

*Triethylene glycol dimethyl ether*

In a similar manner, glyoxal tetra-methoxy-ethyl acetal was hydrogenolyzed in the presence of Raney nickel catalyst at a hydrogen pressure of 1500 p. s. i., and a temperature of 215° to 270° C. Upon distilling the reaction products, a good yield of the dimethyl ether of triethylene glycol was obtained, which was identified by its boiling point of 103°–104° C. at 10 mm. Hg, and its specific gravity of 0.990 at 20° C. A corresponding amount of ethylene glycol mono-methyl ether was also recovered. A small amount of di-ethylene glycol mono-methyl ether was also obtained as a side reaction product.

The above examples illustrate the process details of the invention and many other glycol and polyglycol diethers of the type heretofore described may be prepared by the general method disclosed.

In the appended claims, the term "alkylene glycol" is intended to include both monoalkylene and polyalkylene glycols.

We claim:

1. Process for making an alkylene glycol diether which comprises heating hydrogen under pressure with an acetal compound of the structure

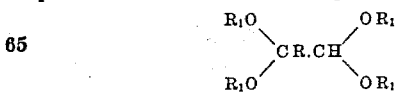

where R is a radical of the group consisting of hydrogen and methyl, and R₁ is a radical of the group consisting of alkyl, aralkyl, alkoxyalkyl and alkoxyalkenoxy and alkoxy-polyalkenoxy-alkyl, and recovering an alkylene glycol diether from the hydrogenolysis products.

2. Process for making an alkylene glycol diether which comprises heating hydrogen at a temperature of 150° to 400° C., under a pressure of 200 to 2000 p. s. i., and in the presence of a nickel catalyst with an acetal compound of the structure.

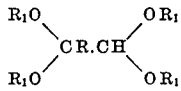

where R is a radical of the group consisting of hydrogen and methyl, and R₁ is a radical of the group consisting of alkyl, aralkyl, alkoxyalkyl and alkoxyalkenoxy and alkoxy-polyalkenoxyalkyl, and recovering an alkylene glycol diether from the hydrogenolysis products.

3. Process for making a polyalkylene glycol dialkyl ether, which comprises heating glyoxal tetra-acetals of alkylene glycol monoalkyl ethers with hydrogen under pressure, and recovering a polyalkylene glycol dialkyl ether from the hydrogenolysis products, the heating being carried out at a temperature of 150° to 300° C., and in the presence of a metal hydrogenation catalyst.

4. Process for making triethylene glycol dialkyl ethers, which comprises heating glyoxal tetra-alkoxyethyl acetals with hydrogen under pressure, and recovering a triethylene glycol dialkyl ether from the hydrogenolysis products, the heating being carried out at a temperature of 150° to 300° C., and in the presence of a metal hydrogenation catalyst.

5. Process for making ethylene glycol dialkyl ethers, which comprises heating glyoxal tetraalkyl acetals with hydrogen under pressure, and recovering an ethylene glycol dialkyl ether from the hydrogenolysis products, the heating being carried out at a temperature of 150° to 300° C., and in the presence of a metal hydrogenation catalyst.

6. Process for making ethylene glycol dibutyl ether, which comprises heating glyoxal tetrabutyl acetal with hydrogen under pressure, and recovering ethylene glycol dibutyl ether from the hydrogenolysis products, the heating being carried out at a temperature of 150° to 300° C., and in the presence of a metal hydrogenation catalyst.

7. Process for making triethylene glycol dimethyl ether, which comprises heating glyoxal tetra-methoxyethyl with hydrogen under pressure, and recovering triethylene glycol dimethyl ether from the hydrogenolysis products, the heating being carried out at a temperature of 150° to 300° C., and in the presence of a metal hydrogenation catalyst.

RAYMOND W. McNAMEE.
LOUIS G. MacDOWELL.

REFERENCES CITED

The following references are of record in the file of this patent:

UNITED STATES PATENTS

| Number | Name | Date |
| --- | --- | --- |
| 2,111,234 | Zellhoefer | Mar. 15, 1938 |
| 2,146,323 | Zellhoefer | Feb. 7, 1939 |
| 2,146,324 | Zellhoefer | Feb. 7, 1939 |
| 2,194,405 | Purves | Mar. 19, 1940 |
| 2,321,094 | MacDowell | June 8, 1943 |